United States Patent
Sun et al.

(10) Patent No.: US 9,857,835 B2
(45) Date of Patent: Jan. 2, 2018

(54) PROTECTIVE COVER AND DEVICE HAVING THE PROTECTIVE COVER

(71) Applicant: Xiaomi Inc., Beijing (CN)

(72) Inventors: Wei Sun, Beijing (CN); Zhenfei Lei, Beijing (CN); Xiangdong Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 529 days.

(21) Appl. No.: 14/582,203

(22) Filed: Dec. 24, 2014

(65) Prior Publication Data

US 2015/0378422 A1   Dec. 31, 2015

Related U.S. Application Data

(63) Continuation of application No. PCT/CN2014/089222, filed on Oct. 23, 2014.

(30) Foreign Application Priority Data

Jun. 27, 2014 (CN) .......................... 2014 1 0302987

(51) Int. Cl.
*G06F 1/32* (2006.01)
*G06F 1/16* (2006.01)
*G01D 5/14* (2006.01)

(52) U.S. Cl.
CPC .......... *G06F 1/1626* (2013.01); *G06F 1/1677* (2013.01); *G01D 5/145* (2013.01);
(Continued)

(58) Field of Classification Search
CPC ................. G06F 1/1626; G06F 1/1677; G06F 2200/1633; G06F 2200/1634; G01D 5/145
(Continued)

(56) References Cited

U.S. PATENT DOCUMENTS 7,747,007 B2   6/2010   Hyun et al.
8,253,518 B2 *   8/2012   Lauder .................. G06F 1/1647
                                                                  206/320

(Continued)

FOREIGN PATENT DOCUMENTS

CN   202218482 U   5/2012
CN   202735956 U   2/2013
(Continued)

OTHER PUBLICATIONS

Extended European Search Report of EP 15173914.1.
International Search Report of PCT/CN2014/089222.
"International Search Report for PCT/CN2014/089222".

*Primary Examiner* — Tung X Nguyen
*Assistant Examiner* — Lee Rodak
(74) *Attorney, Agent, or Firm* — Jun He Law Offices P.C.; James J. Zhu

(57) ABSTRACT

A device having a protective cover includes an electronic device and a protective cover; the electronic device includes a screen and a Hall sensor; the protective cover is provided with a magnet body including at least two magnets, in which at least one magnet having magnetic lines that pass through the Hall sensor when the protective cover covers on the screen. By providing at least two magnets in the protective cover, when the protective cover covers and moves on the screen, the magnetic lines of at least one magnet of the two magnets are able to pass through the Hall sensor in the electronic device.

6 Claims, 4 Drawing Sheets

(52) U.S. Cl.
CPC ............ *G06F 2200/1633* (2013.01); *G06F 2200/1634* (2013.01)

(58) Field of Classification Search
USPC ...... 361/679.01–679.61; 324/207.11–207.21, 324/174
See application file for complete search history.

(56) References Cited

U.S. PATENT DOCUMENTS

| | | | | |
|---|---|---|---|---|
| 8,390,411 | B2* | 3/2013 | Lauder | G06F 1/1626 206/320 |
| 2004/0180649 | A1 | 9/2004 | Vogel et al. | |
| 2006/0114183 | A1 | 6/2006 | Jung | |
| 2013/0328914 | A1* | 12/2013 | Smith | G06F 3/01 345/619 |
| 2013/0328917 | A1* | 12/2013 | Zambetti | G06F 1/1626 345/620 |
| 2014/0043748 | A1 | 2/2014 | Sartee et al. | |
| 2014/0071036 | A1* | 3/2014 | Blue | G06F 1/1626 345/156 |
| 2014/0159839 | A1* | 6/2014 | Kim | H04B 1/3888 335/219 |
| 2014/0306553 | A1 | 10/2014 | Lee | |
| 2015/0061648 | A1* | 3/2015 | Park | G01B 7/003 324/207.2 |
| 2015/0097558 | A1* | 4/2015 | Jin | H04B 1/3888 324/226 |

FOREIGN PATENT DOCUMENTS

| | | |
|---|---|---|
| CN | 202916762 U | 5/2013 |
| CN | 203178852 U | 9/2013 |
| CN | 103488253 A | 1/2014 |
| CN | 203524031 U | 4/2014 |
| EP | 1879364 A1 | 1/2008 |
| EP | 2410717 A1 | 1/2012 |
| JP | 2006514750 A | 5/2006 |
| JP | 4349947 B2 | 10/2009 |
| JP | 2014023096 A | 2/2014 |
| KR | 101350567 | 1/2014 |
| KR | 1020140112661 | 9/2014 |
| RU | 64839 U1 | 7/2007 |

* cited by examiner

Protective cover is closed

PROTECTIVE COVER AND DEVICE HAVING THE PROTECTIVE COVER

CROSS REFERENCE TO RELATED APPLICATIONS

This application is a Continuation of International Application No. PCT/CN2014/089222 with an international filing date of Oct. 23, 2014, which is based upon and claims priority to Chinese Patent Application No. 201410302987.2, filed on Jun. 27, 2014, the entire contents of which are incorporated herein by reference.

TECHNICAL FIELD

The present disclosure relates to the field of electronic device accessories, and more particularly, to a protective cover and a device having the protective cover.

BACKGROUND

Currently, the display of electronic devices, such as smart phone and tablets, is becoming increasingly large. Users usually provide a protective cover to their electronic devices to protect the screen of the electronic devices in use, and the protective cover can also be used to achieve functions of locking and waking up the screen.

In order to achieve the lock screen and wake up functions of the electronic device, the electronic device is usually provided with a Hall sensor, while the protective cover is provided with a magnet, so as to ensure that the Hall sensor is in the magnetic field of the magnet when the protective cover is closed. In order to make sure that the Hall sensor is able to be switched on and off under the action of the magnet, it is necessary that the relative position between the Hall sensor and the magnet meets a high requirement. In some situation, there is a distance between the magnet and the Hall sensor in a transverse direction of the screen, such that when the protective cover is folded, the Hall sensor fails to pass through the magnetic lines of the magnet if the cover moves right or left. Thus, a manner of enhancing the magnetic field intensity of the magnet is usually adopted so as to allow the Hall sensor to pass through by the magnetic lines of the magnet even if the protective cover moves right or left.

SUMMARY

The present disclosure provides a protective cover and a device having the protective cover. The technical solutions are as below.

According to a first aspect of the embodiments of the present disclosure, a device having a protective cover is provided. The device may include an electronic device and a protective cover, wherein the electronic device comprises a screen and a Hall sensor; and the protective cover is provided with a magnet body comprising at least two magnets, in which at least one magnet having magnetic lines that pass through the Hall sensor when the protective cover covers the screen.

According to a second aspect of the embodiments of the present disclosure, a protective cover is provided. The protective cover is used for covering on a screen of an electronic device having a Hall sensor.

The protective cover is provided with a magnet body including at least two magnets, in which at least one magnet having magnetic lines that pass through the Hall sensor when the protective cover covers the screen.

The technical solutions according to embodiments of the present disclosure may have the following advantages.

By providing at least two magnets in the protective cover, when the protective cover covers and moves on the screen, the magnet lines of at least one magnet of the two magnets are able to pass through the Hall sensor in the electronic device, such that the problem in the relevant art that the stability of the electronic compass will be affected due to the increased magnetic field intensity can be solved; when the protective cover covers on the screen, the magnet lines of at least one magnet of the at least two magnets are able to pass through the Hall sensor in the electronic device, such that when the protective cover moves, the Hall sensor is still able to be passed through by the magnet lines of one of the magnets without increasing the magnetic field intensity, thus achieving an advantage of effectively ensuring the accuracy of the lock screen and wake up functions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

"Electronic devices" mentioned in the disclosure may be smart phones, tablets, smart TVs, electronic readers, MP3 players (Moving Picture Experts Group Audio Layer III), MP4 (Moving Picture Experts Group Audio Layer IV) players, laptops, smart cameras, smart video cameras and the likes.

In order to ensure that a Hall sensor in a electronic device is able to achieve a function of controlling a hibernating state of the electronic device when a protective cover is closed, there is usually provided a magnet in the protective cover, and magnetic lines of the magnet can pass through the Hall sensor when the protective cover is closed.

Figure 1A:
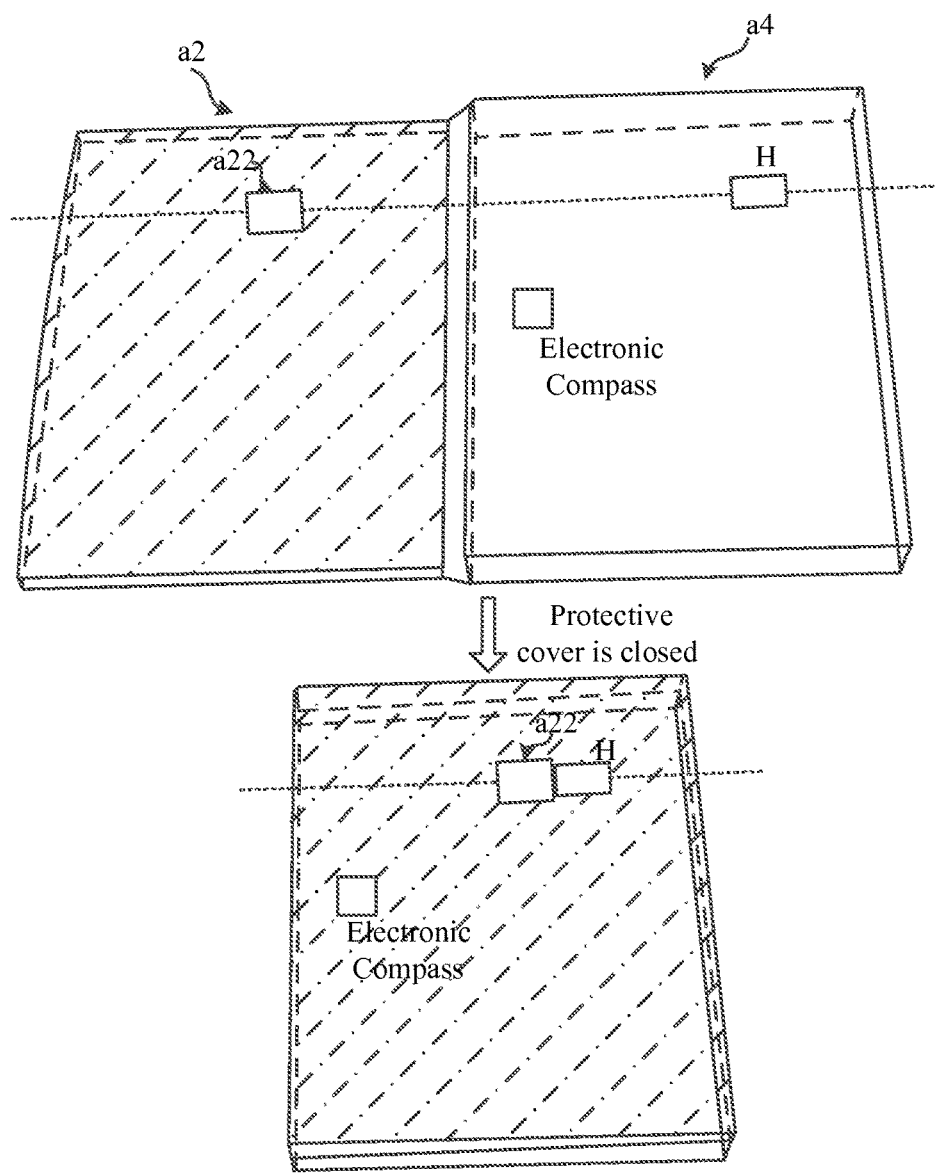
FIG. 1A is a diagram of a device having a protective cover and the protective cover in a closed state according to an exemplary embodiment.

Particularly, referring to FIG. 1A, it is a diagram of a device having a protective cover, and the protective cover is in a closed state according to an exemplary embodiment. In FIG. 1A, a magnet a22 is located on a protective cover a2, and a Hall sensor H is located on an electronic device a4. Herein, a relative position between the magnet a22 and the Hall sensor H is configured that a line formed from a projection of the magnet a22 on the electronic device to the Hall sensor H is parallel with a transverse direction of the electronic device when the protective cover a2 is closed (i.e., the protective cover a2 covers on the screen of the electronic device a4). In another word, when the protective cover a2 is closed, the projection of the magnet a22 on the electronic device is aligned with the Hall sensor H in the transverse direction of the electronic device a4. Here, the magnet a22 is located on a left side of the Hall sensor H.

Figure 1B:
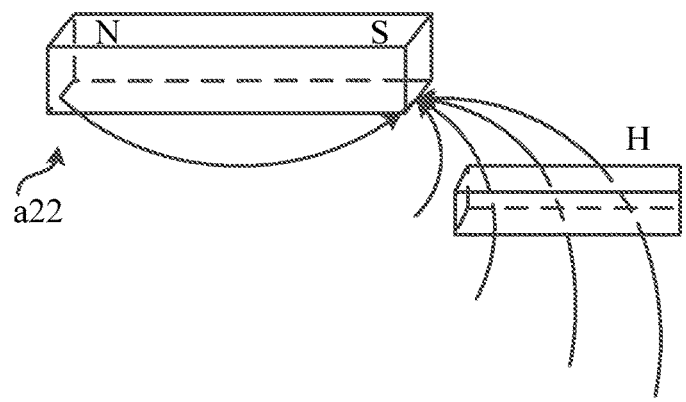
FIG. 1B is a diagram showing that magnetic lines of a magnet pass through a Hall sensor when the protective cover of FIG. 1A is closed.

The distance between the magnet a22 and the Hall sensor H aligned with each other in the transverse direction may be adjusted, such that magnetic lines of the magnet a22 can pass through the Hall sensor H when the protective cover a2 is closed. Referring to FIG. 1B, which is a diagram showing that magnetic lines of a magnet pass through a Hall sensor when the protective cover of FIG. 1A is closed, the magnet lines of the magnet a22 (i.e., magnetic lines from pole N to pole S of the magnet a22) can pass through the Hall sensor H.

Figure 1C:
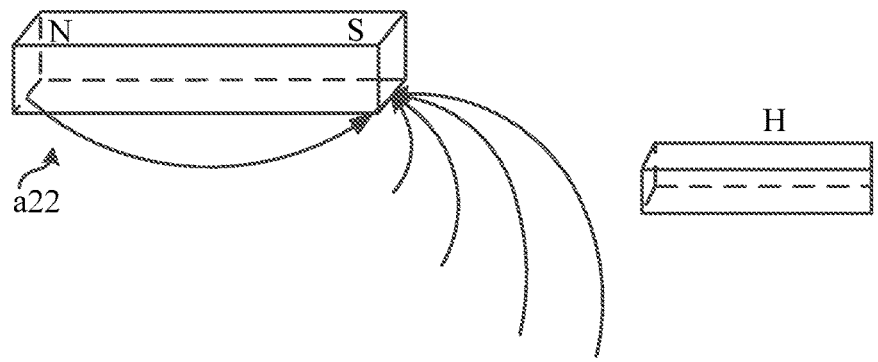
FIG. 1C is a diagram showing that magnetic lines of a magnet do not pass through a Hall sensor when the protective cover of FIG. 1A is closed.

The magnet a22 is located at a fixed position on the protective cover a2, and the Hall sensor H is located at a fixed position on the electronic device a4, therefore, the relative position between the magnet a22 and the Hall sensor H is changed when the closed protective cover a2 moves right or left. For example, the magnet a22 at left side of the Hall sensor H moves towards the left side, such that the distance between the magnet a22 and the Hall sensor H is increased. Referring to FIG. 1C, it is a diagram showing that magnetic lines of a magnet do not pass through a Hall sensor when the protective cover of FIG. 1A is closed. At this time, the magnetic lines of the magnet a22 are prone to no longer pass through the Hall sensor H.

It is easily to conceive that in order to ensure that the magnetic lines of the magnet a22 are still able to pass through the Hall sensor H even when the protective cover a2 moves, the magnetic field intensity of the magnet a22 may be increased. However, the electronic compass in the electronic device a4 is prone to be affected by the increased magnetic field intensity, which results in the lowering of its accuracy.

Consequently, the protective cover in FIG. 1A needs to be improved to provide a magnet body including at least two magnets, wherein magnetic lines of at least one magnet can pass through the Hall sensor when the protective cover covers the screen of the electronic device.

In a possible implementing manner, the magnet body may include a first magnet and a second magnet, which are configured such that projections of the first and second magnets on the screen are aligned with the Hall sensor when the protective cover covers on the screen of the electronic device, and are symmetrically located at both sides of the Hall sensor respectively. In order to prevent magnetic lines which pass through the Hall sensor from being affected when the protective cover moves right or left, a line formed from the first magnet to the second magnet may be configured to be parallel with the transverse direction of the screen when the protective cover covers the screen of the electronic device. In order to prevent the magnetic lines which pass through the Hall sensor from being affected when the protective cover moves up and down, a line formed from the first magnet to the second magnet may be configured to be parallel with a longitudinal direction of the screen.

Figure 2A:
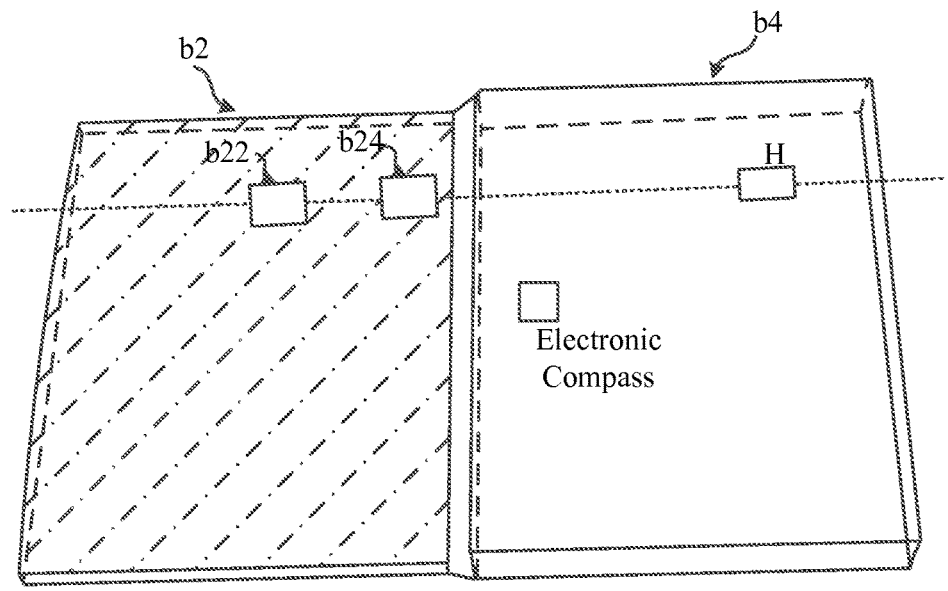
FIG. 2A is a diagram of a device having a protective cover and the protective cover in a closed state according to another exemplary embodiment.
Figure 2A:
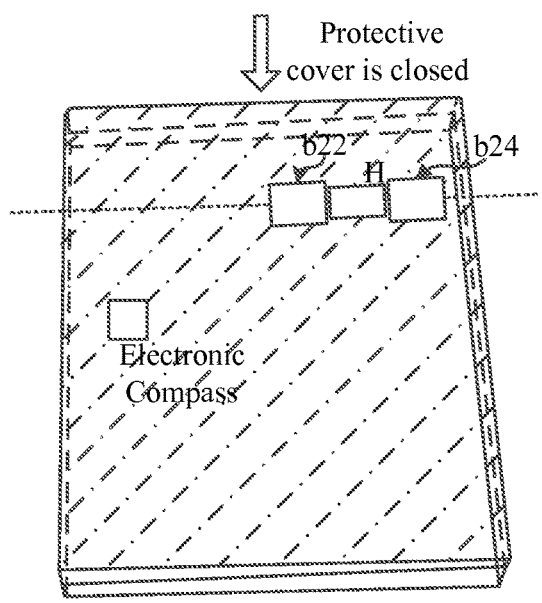
Figure 2B:
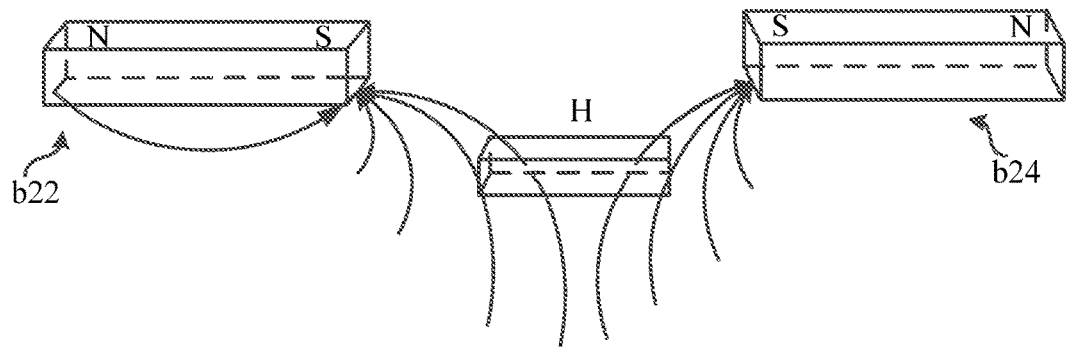
FIG. 2B is a diagram showing that magnetic lines of a first and a second magnets pass through a Hall sensor when the protective cover of FIG. 2A is closed.

For example, referring to FIG. 2A, it is a diagram of a device having a protective cover and the protective cover in a closed state according to another exemplary embodiment. In FIG. 2A, a first magnet b22 and a second magnet b24 are located in a protective cover b2, and a Hall sensor H is located in an electronic device b4. When the protective cover b2 covers a front screen of the electronic device b4, i.e., when projections of the first magnet b22 and the second magnet b24 are located at both sides of the Hall sensor H respectively, as shown in FIG. 2B, the magnetic lines of both the first and the second magnets pass through the Hall sensor when the protective cover of FIG. 2A is closed. As shown in FIG. 2B, the magnetic lines of both the first magnet b22 and the second magnet b24 pass through the Hall sensor H.

Figure 2C:
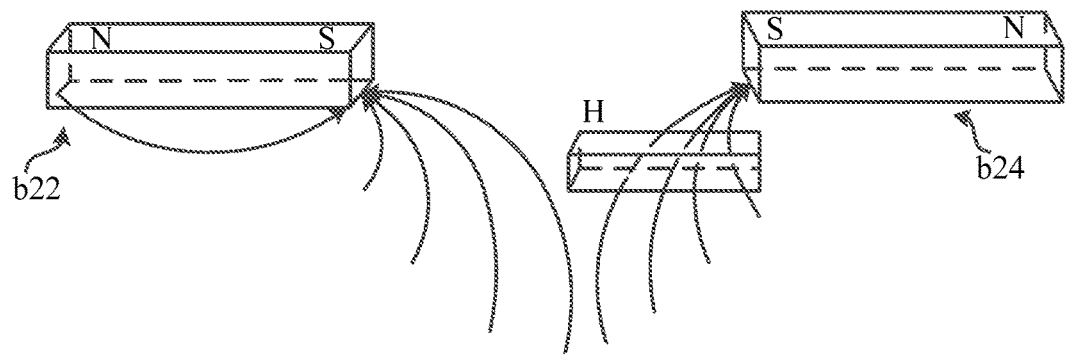
FIG. 2C is a diagram showing that magnetic lines of the second magnet pass through the Hall sensor when the protective cover of FIG. 2A is closed.

For example, when the protective cover b2 as shown in FIG. 2A covers on the screen of the electronic device b4 and moves to the left, i.e., when the first magnet b22 is farther away from the Hall sensor H, then the second magnet b24 is much closer to the Hall sensor. Referring to FIG. 2C which is a diagram showing that magnetic lines of the second magnet pass through the Hall sensor when the protective cover of FIG. 2A is closed, at this time, the first magnet b22 is farther away from the Hall sensor H, such that the magnetic lines of the first magnet b22 no longer pass through the Hall sensor, while the second magnet b24 is much closer to the Hall sensor, such that the magnetic lines of the second magnet b24 can still pass through the Hall sensor H.

Figure 2D:
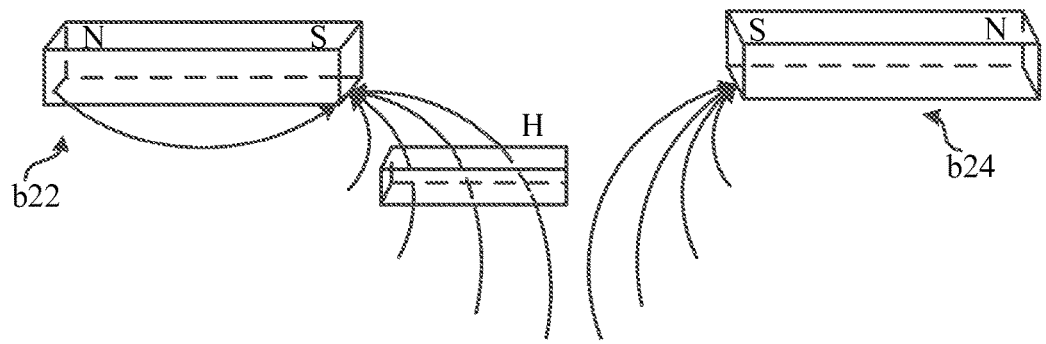
FIG. 2D is a diagram showing that magnetic lines of the first magnet pass through the Hall sensor when the protective cover of FIG. 2A is closed.

For example, when the protective cover b2 as shown in FIG. 2A covers on the screen of the electronic device b4 and moves to the right, i.e., when the first magnet b22 is much closer to the Hall sensor H, then the second magnet b24 is farther away from the Hall sensor H. Referring to FIG. 2D which is a diagram showing that magnetic lines of the first magnet pass through a Hall sensor when the protective cover of FIG. 2A is closed, at this time, the second magnet b24 is farther away from the Hall sensor H, such that the magnetic lines of the second magnet b24 no longer pass through the Hall sensor, while the first magnet b22 is much closer to the Hall sensor, such that the magnetic lines of the first magnet b22 can still pass through the Hall sensor H.

Figure 2E:
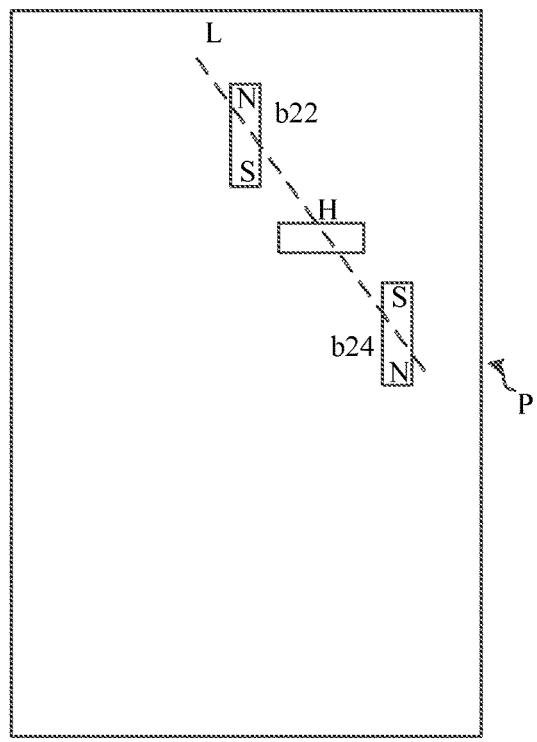
FIG. 2E is a diagram of a correlation of relative positions between two magnets and the Hall sensor when the protective cover is closed according to an exemplary embodiment.

Apparently, when the protective cover covers the screen of the electronic device, the angle between a line formed by the projections of the first and second magnets and the transverse direction of the screen may be arbitrary. As shown in FIG. 2E which is a diagram of a correlation of relative positions between two magnets and the Hall sensor when the protective cover is closed according to an exemplary embodiment, the angle between a line L formed by the projections of the first magnet b22 and the second magnet b24 on the screen P and the transverse direction of the screen P may be a certain angle, for example, the angle may be 0°, i.e., the line L is parallel with the transverse direction of the screen P; the angle may be 90°, i.e., the line L is parallel with the longitudinal direction of the screen P; further, the angle may be larger than 0° and smaller than 90°.

In another possible implementing manner, a magnet body may include at least two pairs of magnets, each pair of magnets is configured such that projections of each pair of magnets on the screen are symmetrically located at both sides of the Hall sensor when the protective cover covers the screen of the electronic device. Optionally, the minimum angle between a line formed by the first pair of magnets and a line formed by the second pair of magnets is larger than 0°. The first and second pairs of magnets are any two pairs of magnets in the magnet body. That is to say, the magnet body may include an even number of magnets (such as 2 pieces, 4 pieces, 6 pieces and so on). When the protective cover may cover the screen of the electronic device, the projections of each pair of magnets in the protective cover are symmetrically located at both sides of the Hall sensor, so as to ensure that when the protective cover moves along a line formed by the projections of each pair of magnets, the magnetic lines of at least one magnet of the pair of magnets are able to pass through the Hall sensor. Apparently, the illustration for each pair of magnets may refer to FIGS. 2B, 2C and 2D.

Figure 3:
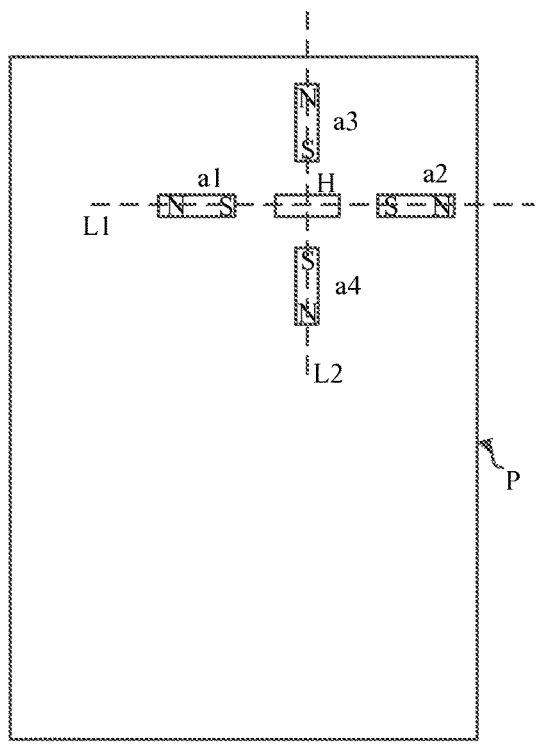
FIG. 3 is a diagram of a correlation of relative positions between four magnets and the Hall sensor when the protective cover is closed according to an exemplary embodiment.

For example, referring to FIG. 3, it is a diagram of a correlation of relative positions between four magnets and the Hall sensor when the protective cover is closed according to an exemplary embodiment. A magnet body includes a pair of a first magnet a1 and a second magnet a2 and a pair of a third magnet a3 and a fourth magnet a4. When the protective cover is closed, projections of the first magnet a1 and the second magnet a2 are located at left and right sides of a Hall sensor H respectively, i.e., a line L1 formed from the projection of the first magnet a1 to that of the second magnet a2 is parallel with the transverse direction of the screen P. Moreover, projections of the third magnet a3 and the fourth magnet a4 are located at upper and lower sides of the Hall sensor H respectively, i.e., a line L2 formed from the projection of the third magnet a3 to that of the fourth magnet a4 is parallel with the longitudinal direction of the screen P. Apparently, lines L1, L2 and the transverse direction of the screen P may be configured at other angles.

In conclusion, in the protective cover and the device having the protective cover provided by the embodiments of the present invention, by providing at least two magnets in the protective cover, when the protective cover covers and moves on the screen, the magnetic lines of at least one magnet of the two magnets are able to pass through the Hall sensor in the electronic device, such that the problem in the relevant art that the stability of the electronic compass will be affected due to the increased magnetic field intensity can be solved; when the protective cover covers the screen, the magnetic lines of at least one magnet of the at least two magnets are able to pass through the Hall sensor in the electronic device, such that when the protective cover moves, the Hall sensor is still able to be passed through by the magnetic lines of one of the magnets without increasing the magnetic field intensity, thus achieving an advantage of effectively ensuring the accuracy of the lock screen and wake up functions.

Other embodiments of the invention will be apparent to those skilled in the art from consideration of the specification and practice of the invention disclosed here. This application intends to cover any variations, uses, or adaptations of the invention following the general principles thereof and including such departures from the present disclosure as come within known or customary practice in the art. It is intended that the specification and embodiments be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A device having a protective cover, comprising:
    an electronic device; and
    the protective cover,
    wherein the electronic device comprises a screen and a Hall sensor; and the protective cover is provided with a magnet body comprising at least two pairs of magnets, wherein each pair of magnets are configured that projections of each pair of magnets on the screen are symmetrically located at both sides of the Hall sensor when the protective cover covers the screen, and the minimum angle between a line formed by the first pair of magnets and a line formed by the second pair of magnets is larger than 0°, the first and second pairs of magnets being any two pairs of magnets in the magnet body, and wherein at least one magnet has magnetic field lines that pass through the Hall sensor when the protective cover covers the screen.

2. The device according to claim 1, wherein each pair of magnets comprises a first magnet and a second magnet, and a line formed from the first magnet to the second magnet is parallel with a transverse direction of the screen.

3. The device according to claim 1, wherein each pair of magnets comprises a first magnet and a second magnet, and a line formed from the first magnet to the second magnet is parallel with a longitudinal direction of the screen.

4. A protective cover, used for covering a screen of an electronic device having a Hall sensor, comprising:
    a magnet body comprising at least two pairs of magnets, wherein each pair of magnets are configured that projections of each pair of magnets on the screen are symmetrically located at both sides of the Hall sensor when the protective cover covers the screen, and the minimum angle between a line formed by the first pair of magnets and a line formed by the second pair of magnets is larger than 0°, the first and second pairs of magnets being any two pairs of magnets in the magnet body, and wherein at least one magnet having magnetic field lines that pass through the Hall sensor when the protective cover covers the screen.

5. The protective cover according to claim 4, wherein each pair of magnets comprises a first magnet and a second magnet, and a line formed from the first magnet to the second magnet is parallel with the transverse direction of the screen.

6. The protective cover according to claim 4, wherein each pair of magnets comprises a first magnet and a second magnet, and a line formed from the first magnet to the second magnet is parallel with the longitudinal direction of the screen.

* * * * *